United States Patent
Cao

(10) Patent No.: US 9,576,121 B2
(45) Date of Patent: Feb. 21, 2017

(54) ELECTRONIC DEVICE AND AUTHENTICATION SYSTEM THEREIN AND METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Dan Cao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 121 days.

(21) Appl. No.: 14/334,875

(22) Filed: Jul. 18, 2014

(65) Prior Publication Data

US 2015/0026797 A1 Jan. 22, 2015

(30) Foreign Application Priority Data

Jul. 19, 2013 (CN) .......................... 2013 1 03063898

(51) Int. Cl.
*G06F 7/04* (2006.01)
*G06F 21/32* (2013.01)

(52) U.S. Cl.
CPC .................................... *G06F 21/32* (2013.01)

(58) Field of Classification Search
CPC ........ G06F 21/31; G06F 21/32; G06F 21/575; H04L 63/0861
See application file for complete search history.

(56) References Cited

U.S. PATENT DOCUMENTS

| 8,457,367 | B1* | 6/2013 | Sipe et al. | 382/118 |
| 2009/0309698 | A1* | 12/2009 | Headley et al. | 340/5.52 |
| 2013/0133048 | A1* | 5/2013 | Wyn-Harris | 726/5 |

OTHER PUBLICATIONS

D. Wagner, et al. "Real-time panoramic mapping and tracking on mobile phones", In Proc. VR 2010, pp. 211-218, 2010.*

* cited by examiner

Primary Examiner — Ali Abyaneh
(74) Attorney, Agent, or Firm — Zhigang Ma

(57) ABSTRACT

An authentication system and method thereof capture an image of a user and extract biometric features of the user from the image to determine whether a stored biometric feature matches with the extracted biometric features. If there is a match, an interactive information is generated to invite the user to perform actions shown or specified or described by the interactive information. The user will be authenticated if an action of the user matches the required action in a timely fashion. An electronic device using the same is also provided.

3 Claims, 2 Drawing Sheets

ELECTRONIC DEVICE AND AUTHENTICATION SYSTEM THEREIN AND METHOD

CROSS-REFERENCE TO RELATED APPLICATIONS

This application claims priority to Chinese Patent Application No. 201310306389.8 filed on Jul. 19, 2013 in China Intellectual Property Office, the contents of which are incorporated by reference herein.

FIELD

The subject matter herein generally relates to biometric authentication.

BACKGROUND

Biometric authentication is widely used in security systems to improve security. For example, a laptop can be unlocked through facial or finger-print recognition.

BRIEF DESCRIPTION OF THE DRAWINGS

Implementations of the present technology will now be described, by way of example only, with reference to the attached figures.

DETAILED DESCRIPTION

Figure 1:
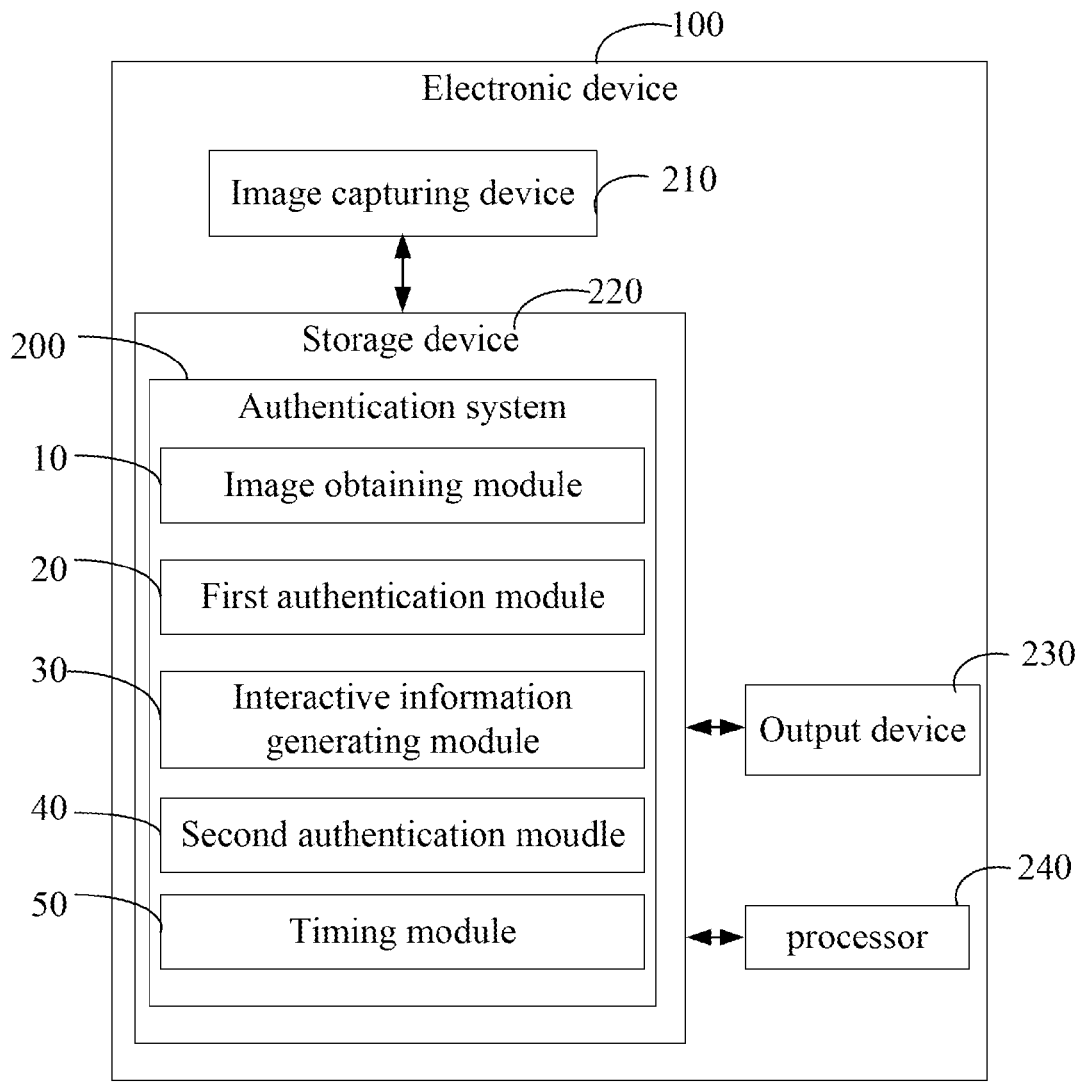
FIG. 1 is a block diagram illustrating an example embodiment of an electronic device running an authentication system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein, However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein.

Several definitions that apply throughout disclosure will now be presented. The term "module" refers to logic embodied in computing or firmware, or to a collection of software instruction, written in a programming language, such as Java, C, or assembly. One or more software instruction in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "coupled" is defined as connected, whether directly or indirectly through intervening components, and is not necessarily limited to physical connections. The connection can be such that the objects are permanently connected or releasably connected. The term "comprising" means "including, but not necessarily limited to", it specifically indicates open-ended inclusion or membership in a so-described combination, group, series and the like.

FIG. 1 illustrates a block diagram of form an electronic device 100 running an authentication system 200. The electronic device 100 includes an image capturing device 210, a storage device 220, an output device 230, and a processor 240. In one embodiment, the storage device 220 can be an internal storage system, such as a flash memory, a random access memory (RAM) for temporary information storage, and/or a read-only memory (ROM) for permanent information storage. The storage device 220 can also be an external storage system, such as a hard disk, a storage card, or a data storage medium. In at least one embodiment, the storage device 220 can include two or more storage devices such that one storage device is a memory and the other storage device is a hard drive. Additionally, one or more of the storage devices can be located externally relative to the electronic device 100. The processor 240 is coupled to the image capturing device 210, the storage device 220, and the output device 230. The processor 240 can be a central processing unit (CPU), a microprocessor, or other data processor chip that performs functions of the electronic device 100.

The image capturing device 210 captures an image of a user. The captured image of the user includes biometric features of the user, such as the face of the user, the fingerprint of the user, and/or the whole form of the user. The image capturing device 210 can be a camera.

The storage device 220 stores a number of biometric features of different registered users. In this embodiment, the electronic device 100 can execute a registration function in response to user input. When the registration function is executed, the processor 240 controls the image capturing device 210 to capture an image of the user for registration, the processor 240 further extracts biometric features of the user from the captured image, and stores the extracted biometric features of the user to the storage device 220 as parameters for user registration and authentication.

The authentication system 200 running in the electronic device 100 can include a number of modules, which are a collection of software instructions executed by the processor 240.

In this embodiment, the authentication system 200 can include an image obtaining module 10, a first authentication module 20, an interactive information generating module 30, a second authentication module 40, and a timing module 50. In the embodiment, the modules of the authentication system 200 are a collection of software instructions executed by the processor 240.

The image obtaining module 10 can obtain the image of the user captured by the image capturing device 210 in response to an authentication operation. In the embodiment, the authentication operation can be ancillary to the user requiring access to a secured object. The secured object can be a secured file or a secured application or other exclusive asset.

The first authentication module 20 is used to extract biometric features of a user from the obtained image, and compare the extracted biometric features with the stored biometric features of the registered users to determine whether one of the stored biometric features matches with the extracted biometric feature. If the first authentication module 20 determines that none of the stored biometric features matches with the extracted biometric feature, the first authentication module 20 determines that authentication of the user has failed. For example, if the face is the biometric feature which has been obtained, the first authentication module 20 extracts features from an image of the user's face, for example by using a well known facial-recognition technology, and determines whether the extracted facial feature of the user matches with one of the stored facial features.

If the first authentication module 20 determines that the extracted biometric feature matches with one of the stored biometric feature, the interactive information generating module 30 generates an interactive information to invite the user to perform actions. For example, the interactive information can invite the user to move his/her face to the left and then smile. In this embodiment, the actions which interactive information requires the users to perform are generated randomly. In the embodiment, the interactive information can be displayed as a video. In other embodiments, the interactive information can be presented as text, as an audio message, and the like. The output device 230 is used to output the interactive information to the user. In this embodiment, the output device 230 can be a display. In other embodiments, the output device 230 can be a loudspeaker.

The image capturing device 210 captures images of the user at intervals (such as every 0.1 second) to obtain a number of sequential images of the user.

The second authentication module 40 determines an action performed by the user according to the sequential images of the user obtained by the image capturing device 210, and determines whether or not the action performed by the user matches with the action that the user was required to do, and further determines whether or not the action performed by the user is continuous and uninterrupted. If the second authentication module 40 determines that the action performed by the user matches with the action that the user was required to do and further that the action of the user is continuous and uninterrupted, the second authentication module 40 determines that the user is authentic. If the second authentication module 40 determines that the action of the user does not match with the required action to be performed, or if the action of the user is not continuous and uninterrupted, the second authentication module 40 determines that the user is not authentic.

In this embodiment, a position of the image capturing device 210 is fixed. The second authentication module 40 compares an obtained image of the user with the immediately preceding obtained image to determine the position and/or action of the user. In detail, each of the captured images of the user includes a biometric feature of the user and background graphics, the second authentication module 40 determines the action of the user by determining whether the position of a biometric feature of the user in the images changes to carry out and follow the action requirement and whether there is any relative change in the background graphics in the images. If the second authentication module 40 determines that the position of a biometric feature of the user in the images is changed appropriately and that the background graphics in the images do not move, the second authentication module 40 determines that the action of the user matches with the required action to be performed. Otherwise, the second authentication module 40 determines that the action of the user does not match the required action.

In this embodiment, the storage device 220 further stores a preset time period. The timing module 50 starts timing when the interactive information generating module 30 presents the interactive information. If the timing module 50 determines that the user does not complete the required action within the preset time period, the second authentication module 40 determines that there is no authentication. If the timing module 50 determines that the user finishes the required action within the preset time period, the second authentication module 40 determines that there is authentication of the user.

In the embodiment, the modules of the authentication system 200 cause the processor 240 to execute the above functions.

Figure 2:
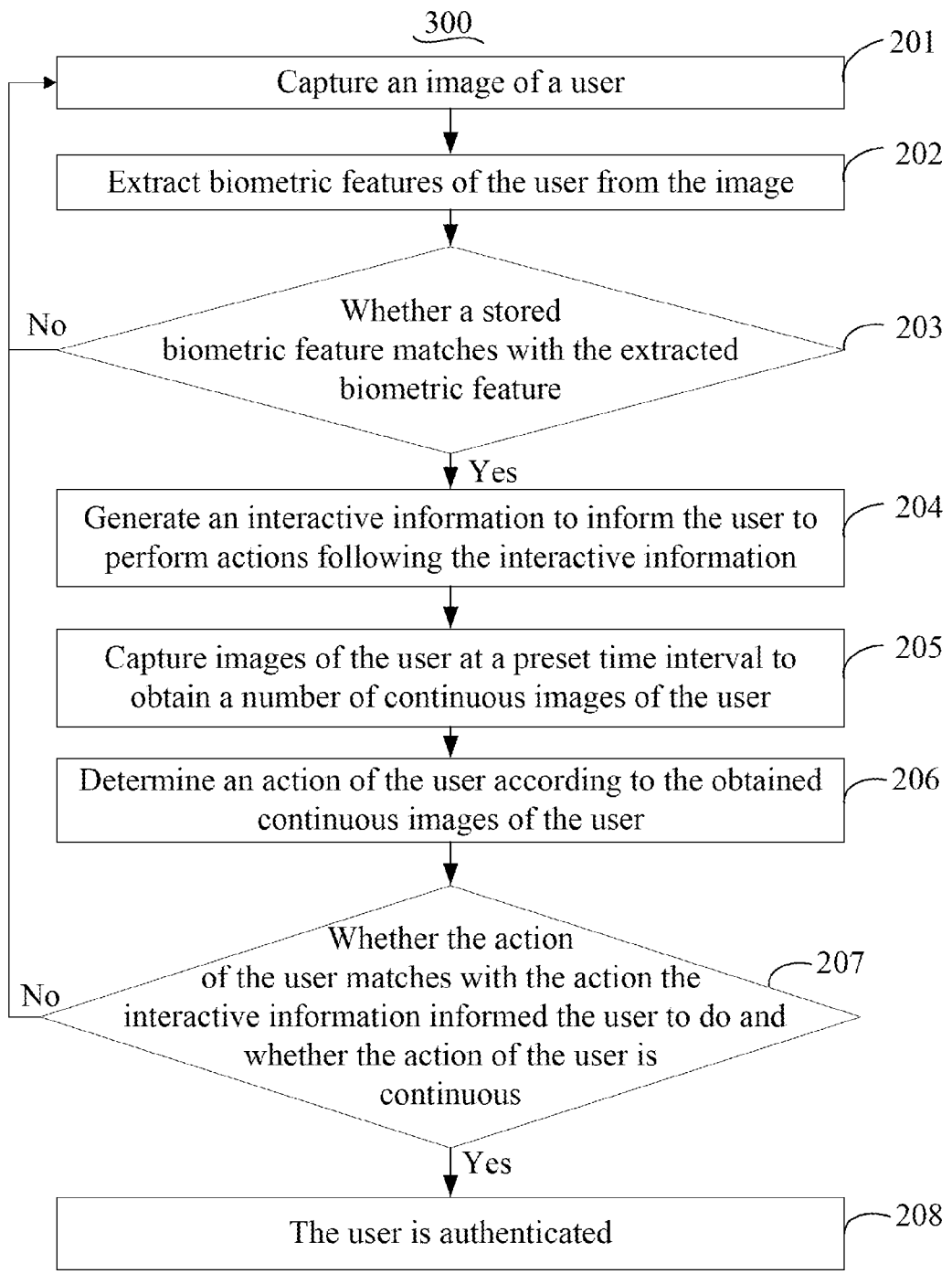
FIG. 2 is a flowchart of an example embodiment of an authentication method.

FIG. 2 illustrates an embodiment of a method. The method of the authentication method 300 is provided by way of example, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Additionally, the illustrated order of blocks is by example only and the order of the blocks can be changed. The example method can begin at block 201.

At block 201, an image capturing device captures an image of a user, the captured image of the user includes biometric features of the user.

At block 202, a first authentication module extracts biometric features of the user from the captured image.

At block 203, the first authentication module compares the extracted biometric features with stored biometric features of registered users to determine the existence of any matches. If the biometric features match a registered user, the procedure proceeds to block 204. If the biometric features do not match a registered user, the procedure goes back to block 201.

At block 204, an interactive information generating module generates an interactive information to invite the user to perform actions that are specified by the interactive information.

At block 205, the image capturing device captures images of the user at intervals (such as every 0.1 second) to obtain a number of sequential images of the user.

At block 206, a second authentication module determines an action of the user according to the obtained sequential images of the user.

At block 207, the second authentication module determines whether the action of the user matches with the action that the user was required to perform, and further determines whether the action of the user is continuous and uninterrupted. If the second authentication module determines that the action of the user does match with the required action and that the action of the user is continuous and uninterrupted, the procedure proceeds to block 208; otherwise, the procedure goes back to block 201.

At block 208, the second authentication module determines that the user is authenticated.

In this embodiment, block 208 can further include a timing module which starts to time when the interactive information is presented. The determination by the second authentication module that the user is authenticated upon the user completing the required action within the preset time period. The second authentication module determines that the user is not authenticated if the timing module determines that the user fails to complete the required action within the preset time period.

The embodiments shown and described above are only examples. Many further details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electronic device comprising: an image capturing device to capture images of a user;
   a storage device configured to store a number of biometric features of different registered users;
   a processor coupled to the image capturing device and the storage device; an image obtaining module, stored in the storage device, comprising instructions to cause the processor to obtain an image of the user captured by the image capturing device in response to an authentication operation;
   a first authentication module, stored in the storage device, comprising instructions to cause the processor to extract biometric features of the user from the obtained image, and compare the biometric features extracted from the obtained image with the stored biometric features of the registered user to determine whether one of the stored biometric features matches with the biometric features extracted from the image of the user;
   an interactive information generating module, stored in the storage device, comprising instructions to cause the processor to generate an interactive information to invite the user to perform actions when the first authentication module determines that one of the stored biometric features of registered user matches with one of the biometric features extracted from the image of the user; the image capturing device further capturing images of the user at intervals to obtain a number of sequential images of the user; and
   a second authentication module, stored in the storage device, comprising instructions to cause the processor to determine an action performed by the user according to the sequential images obtained by the image capturing device, and determine whether or not the action performed by the user matches with the action that the interactive information required the user to do, and further determine whether or not the action performed by the user is continuous and uninterrupted; when determining that the action performed by the user matches with the action that the user was required to do and further that the action performed by the user is continuous and uninterrupted, the second authentication module determining that the user is authentic;
   wherein each of the sequential images of the user comprises a biometric feature of the user and background graphics, the second authentication module determines the action of the user by determining whether a position of a biometric feature of the user in the images is changed to carry out and follow the action requirement and whether there is any change in the background graphics in the images; when the second authentication module determines that the position of a biometric feature of the user in the images is changed to match with the interactive information, and that the background graphics in the images are not moved, the second authentication module determines that the action of the user matches with the action that the user was required to perform; otherwise, the second authentication module determines that the action of the user does not match with the required action.

2. An authentication system applied in an electronic device, the electronic device comprising an image capturing device to capture images of a user, and a storage device storing a number of biometric features of registered user, the authentication system comprising a processor and a plurality of modules executed by the processor, the modules comprising:
   an image obtaining module, stored in the storage device, comprising instructions to cause the processor to obtain an image of the user captured by the image capturing device in response to an authentication operation;
   a first authentication module, stored in the storage device, comprising instructions to cause the processor to extract biometric features of the user from the obtained image, and compare the biometric features extracted from the obtained image with the stored biometric features of the registered user to determine whether one of the stored biometric features matches with the biometric features extracted from the image of the user;
   an interactive information generating module, stored in the storage device, comprising instructions to cause the processor to generate an interactive information to invite the user to perform action when the first authentication module determines that one of the stored biometric features of registered user matches with one of the biometric features extracted from the image of the user; the image capturing device further capturing images of the user at intervals to obtain a number of sequential images of the user; and
   a second authentication module, stored in the storage device, comprising instructions to cause the processor to determine an action performed by the user according to the sequential images obtained by the image capturing device, and determine whether or not the action performed by the user matches with the action that the interactive information required the user to do, and further determine whether or not the action performed by the user is continuous and uninterrupted; when determining that the action performed by the user matches with the action that the user was required to do and further that the action performed by the user is continuous and uninterrupted, the second authentication module determining that the user is authentic;
   wherein each of the sequential images of the user comprises a biometric feature of the user and background graphics, the second authentication module determines the action of the user by determining whether a position of a biometric feature of the user in the images is changed to carry out and follow the action requirement and whether there is any change in the background graphics in the images; when the second authentication module determines that the position of a biometric feature of the user in the images is changed to match with the interactive information, and that the background graphics in the images are not moved, the second authentication module determines that the action of the user matches with the action that the user was required to perform; otherwise, the second authentication module determines that the action of the user does not match with the required action.

3. An authentication method applied in an electronic device, the electronic device comprising an image capturing device to capture images of a user, a storage device storing a number of biometric features of different registered users, and a processor, the authentication method comprising:

obtaining an image of the user captured by the image capturing device;

extracting biometric features of the user from the obtained image by the processor, and determining whether one of the stored biometric features matches with the biometric features extracted from the image of the user by comparing the biometric features extracted from the obtained image with the stored biometric features of the registered user by the processor;

generating an interactive information by the processor to invite the user to perform actions when determining that one of the stored biometric features of registered user matches with one of the biometric features extracted from the image of the user;

capturing images of the user by the image capturing device at intervals to obtain a number of sequential images of the user;

determining an action performed by the user according to the sequential images obtained by the image capturing device, and determining whether or not the action performed by the user matches with the action that the interactive information invites the user to do, and further determining whether the action performed by the user is continuous and uninterrupted; and determining that the authentication of the user is successful by the processor when determining that the action performed by the user matches with the action that the user was invited to do and further that the action performed by the user is continuous and uninterrupted;

wherein each of the sequential images of the user comprises a biometric feature of the user and background graphics, the action performed by the user is determined by determining whether a position of a biometric feature of the user in the images changes to carry out and follow the action requirement and whether there is any change in the background graphics in the images: when the position of a biometric feature of the user in the images is changed to match with the interactive information, and that the background graphics in the images are not moved, it is determined that the action performed by the user matches with the action that the user was invited to do; when the position of a biometric feature of the user in the images is changed to not match with the interactive information, or the background graphics in the images are moved, it is determined that the action performed by the user does not match with the action that the user was invited to do.

* * * * *